United States Patent
Lee et al.

(10) Patent No.: US 10,271,018 B2
(45) Date of Patent: Apr. 23, 2019

(54) METHOD OF DETECTING CRITICAL OBJECTS FROM CCTV VIDEO USING METADATA FILTERING

(71) Applicants: Sungjin Lee, Gwangmyeong-si (KR); Taewoo Kim, Seoul (KR)

(72) Inventors: Sungjin Lee, Gwangmyeong-si (KR); Taewoo Kim, Seoul (KR)

(73) Assignee: INNODEP CO., LTD., Seoul (KR)

( * ) Notice: Subject to any disclaimer, the term of this patent is extended or adjusted under 35 U.S.C. 154(b) by 57 days.

(21) Appl. No.: 15/486,109

(22) Filed: Apr. 12, 2017

(65) Prior Publication Data
US 2018/0241972 A1    Aug. 23, 2018

(30) Foreign Application Priority Data
Feb. 23, 2017    (KR) .................. 10-2017-0023839

(51) Int. Cl.
*H04N 7/00* (2011.01)
*H04N 7/18* (2006.01)
(Continued)

(52) U.S. Cl.
CPC ......... *H04N 7/181* (2013.01); *G06K 9/00771* (2013.01); *G06T 7/194* (2017.01);
(Continued)

(58) Field of Classification Search
CPC .................. H04N 7/181; G06T 7/194; G06T 2207/10016; G06T 2207/30232; G06K 9/00771
See application file for complete search history.

(56) References Cited

U.S. PATENT DOCUMENTS

| 9,740,937 | B2 * | 8/2017 | Zhang ....................... H04N 7/18 |
| 2010/0013931 | A1 * | 1/2010 | Golan ................. G06K 9/00771 |
| | | | 348/150 |

(Continued)

FOREIGN PATENT DOCUMENTS

| KR | 10-1612483 B1 | 4/2016 |
| KR | 10-2016-0135004 A | 11/2016 |
| KR | 10-2017-0001872 A | 1/2017 |

OTHER PUBLICATIONS

C. Y. Jeong, J. W. Han, "Technical Trends of Abnormal Event Detection in Video Analytics," Journal of Electronics and Telecommunications Trends, vol. 27, pp. 114-122, Aug. 2012.

(Continued)

*Primary Examiner* — Zhihan Zhou
(74) *Attorney, Agent, or Firm* — John K. Park; Park Law Firm

(57) ABSTRACT

The invention provides a method of detecting critical objects out of video produced in CCTV cameras. More specifically, the invention provides a method of detecting critical objects out of CCTV video, in which lightweight algorithms of foreground segmentation and blob analysis are applied to the CCTV video in order to detect moving objects and then object filtering is performed based on distribution characteristics of metadata in order to propose critical objects contained in the CCTV video, whereby a few staff members in the integrated control center may efficiently monitor display screen of a large number of CCTV cameras. The invention makes it possible to detect critical objects out of CCTV video with utilizing lightweight algorithms, which enables real-time processing by video analysis servers of normal computing power. Therefore, the efficiency of inte- (Continued)

grated control centers may be improved where massive CCTV videos are gathered from a large number of CCTV cameras.

12 Claims, 9 Drawing Sheets

(51) Int. Cl.
    *G06T 7/194*           (2017.01)
    *G06K 9/00*            (2006.01)

(52) U.S. Cl.
    CPC ......... *H04N 7/188* (2013.01); *G06K 2209/27* (2013.01); *G06T 2207/10016* (2013.01); *G06T 2207/30232* (2013.01)

(56) References Cited

U.S. PATENT DOCUMENTS

| | | | | |
|---|---|---|---|---|
| 2012/0170902 A1* | 7/2012 | Zhu | ................... | H04N 5/76 386/223 |
| 2013/0166711 A1* | 6/2013 | Wang | ................ | H04N 7/181 709/223 |
| 2017/0300759 A1* | 10/2017 | Beard | ............ | G06K 9/00771 |

OTHER PUBLICATIONS

C. Ayesha, C. Santanu, "Video Analytics Revisited," Journal of IET, Computer Vision, vol. 10, No. 4, pp. 237-247, Jul. 2016.

C. Joshua, S. Matthew, B. G. Dmity, B. S. Deborah, K. Rangachar, "Understanding Transit Scenes: A Survey on Human Behavior," Journal of IEEE Trans. Intelligent Transportation, vol. 11, No. 1, pp. 206-224, Mar. 2010.

L. Honghai, C. Shengyong, "Intelligent Video Systems and Analytics: A Survey," Journal of IEEE Trans. Industrial Informatics, vol. 9, No. 3, pp. 1222-1233, Aug. 2013.

T. Shan, S. Chen, C, Sanderson, B. C. Lovell, "Towards robust face recognition for intelligent-cctv based surveillance using one gallery image," NAdvanced Video and Signal Baseed Surveillance, IEEE Conference, pp. 470-475, 2007.

P. I. Rani, K. Muneeswaran, "Robust real time face detection automatically from video sequence based on Haar features," IEEE Communication and Network Technologies. International Conference, pp. 276-280, Dec. 2014.

H. Modi, V. S. Nirav, H. S. Malav, "Obstacle avoidance system in autonomous ground vehicle using ground plane image processing and omnidirectional drive," Computing Communication Control and Automation International Conference., pp. 594-601, 2015.

T. W. Kim, H. H. Kim, P. K. Kim, "The Design of Object-of-Interest Extraction System Utilizing Metadata Filtering from Moving Object," Korea Computer Congress 2016, Jun. 2016.

T. W. Kim, H. H. Kim, P. K. Kim, "The Design of Object-of-Interest Extraction System Utilizing Metadata Filtering from Moving Object," Journal of KIISE, vol. 43, No. 12, pp. 1351-1355, Dec. 2016.

* cited by examiner

FIG. 3

| Metadata | Description |
| --- | --- |
| Object ID | Object identification number |
| Thumbnail Image | The representative image of the object |
| Moving Track | M x 5 Matrix (where, M may be variable by objects)<br>* column 1 : local time index<br>* column 2, 3 : object location<br>* column 4, 5 : object size |
| Appearance Location | The location of first occurrence |
| Disappearance Location | The location of last occurrence |
| Maximum Blob Size | The maximum size of the object |
| Dwell Time | The duration time of the occurrence in seconds |

METHOD OF DETECTING CRITICAL OBJECTS FROM CCTV VIDEO USING METADATA FILTERING

BACKGROUND OF THE INVENTION

The present invention generally relates to a method of detecting critical objects out of video produced in a plurality of CCTV cameras.

More specifically, the present invention relates to a method of detecting critical objects out of CCTV video, in which lightweight algorithms of foreground segmentation and blob analysis are applied to the CCTV video in order to detect a plurality of moving objects and then object filtering is performed based on distribution characteristics of metadata in order to propose critical objects contained in the CCTV video, whereby a few numbers of staff members in the integrated control center may efficiently monitor display screen of a large number of CCTV cameras.

Recently, pluralities of CCTV cameras are installed for the purpose of crime prevention as well as proof of criminal evidence. The videos taken in these CCTV cameras are delivered to police stations or integrated control center, in which staff members monitor the videos for detecting any possible abnormal behavior or criminal evidence.

As the number of CCTV cameras has rapidly increased, the number of staff members becomes not enough to appropriately handle the cameras. According to the National Police Agency data of 2011, the staff members of Seoul are monitoring 45 CCTV cameras per people in average, which renders the crime prevention uneffective.

In the course of criminal investigation, criminal tracing or lost-child search, it may be necessary to check CCTV storage video. The CCTV storage video has been provided from a plurality of CCTV cameras and stored in a storage device for a period of time (e.g., 7 days). In this case, a small number of staff members are conventionally looking over the massive videos. This type of work is far from efficient.

However, it is impractical to expand the staff members for solving the above-mentioned problem. Alternatively, the intelligent control system has been proposed in which the CCTV videos are analyzed by utilizing image processing technology so as to detect and present objects on which staff members may have attention (i.e., critical objects).

In conventional intelligent control systems, it has been researched on optimal arrangement of cameras, data acquisition and storage, feature extraction, object detection, and video data interpretation and visualization, and video analysis. In specific, for commercial usage, automatic identification feature of the intelligent control system shall be good enough to replace operations of staff members. For that purpose, it has been researched on requirements of road traffic situation control center or CCTV integrated control center as well as on human behavior recognition.

As such, the conventional intelligent control systems are generally designed to detect specific behaviors out of CCTV video, e.g., fighting or collapsing. In order to identify behaviors of objects exquisitely enough to replace staff members, the conventional intelligent control systems have adopted heavy algorithms in processing the CCTV video. It means very high-performance image analysis server is required.

The above-described conventional art is unappropriate for the integrated control center in which videos from thousands of CCTV cameras are collected and analyzed. In order to appropriately perform the heavy algorithms on massive amount of high-resolution CCTV videos, the intelligent control system shall be equipped with a very high-performance image analysis server or alternatively equipped with a many numbers of image analysis servers. That is why the intelligent control system is not widely adopted in the integrated control center.

SUMMARY OF THE INVENTION

It is, therefore, an object of the present invention to provide a method of detecting critical objects out of video produced in a plurality of CCTV cameras.

More specifically, it is an object of the present invention to provide a method of detecting critical objects out of CCTV video, in which lightweight algorithms of foreground segmentation and blob analysis are applied to the CCTV video in order to detect a plurality of moving objects and then object filtering is performed based on distribution characteristics of metadata in order to propose critical objects contained in the CCTV video, whereby a few numbers of staff members in the integrated control center may efficiently monitor display screen of a large number of CCTV cameras.

One aspect of the present invention is to provide a method of detecting critical objects from CCTV video using metadata filtering, the method comprising: identifying a plurality of moving objects from the CCTV video; obtaining metadata of the moving objects corresponding to their exposure attribute in the CCTV video; and filtering the moving objects based on the exposure attribute so as to select at least one critical object out of the plurality of moving objects.

In the present invention, the identifying a plurality of moving objects comprises: segmenting foreground from the CCTV video; performing blob analysis on the segmented foreground so as to extract a plurality of foreground objects; sequentially estimating moving track for each of the foreground objects; identifying foreground objects based on the sequential estimation of moving track which are determined as leaving far from the pre-estimated moving track; and regarding the identified foreground objects as new moving objects.

In the present invention, the segmenting foreground comprises: identifying changing pixels out of each input image of the CCTV video by applying Gaussian mixture model in which background image is modeled by a plurality of Gaussian independent variables; updating the parameters of the Gaussian mixture model by learning the Gaussian mixture model using a number of frames of the CCTV video; and modifying the number of frames which is utilized in the learning of the Gaussian mixture model corresponding to computing resource.

In the present invention, the filtering the moving objects comprises: filtering out with reference to the metadata of a plurality of moving objects one or more moving object whose start-to-end distance in the CCTV video is smaller than a predetermined threshold pixel; and filtering out with reference to the metadata of a plurality of moving objects one or more moving object whose dwell time in the CCTV video is shorter than a predetermined threshold time.

In the present invention, the filtering the moving objects further comprises: analyzing metadata distribution with regard to the start-to-end distance and the dwell time for the plurality of moving objects; obtaining a first boundary of start-to-end distance based on the metadata distribution so that the percentage of moving objects having larger start-to-end distance than the first boundary is smaller than a predetermined value; setting the threshold pixel to the first boundary of start-to-end distance; obtaining a second boundary of dwell time based on the metadata distribution so that the percentage of moving objects having longer dwell time than the second boundary is smaller than a predetermined value; and setting the threshold time to the second boundary of dwell time.

In the present invention, the filtering the moving objects further comprises: selecting with reference to the metadata of a plurality of moving objects at least one moving object whose location in the CCTV video satisfies an area condition which is specified by an operator; and selecting with reference to the metadata of a plurality of moving objects at least one moving object whose moving direction or moving speed is movement characteristics condition which is specified by an operator.

In the present invention, the method of detecting critical objects from CCTV video further comprises: generating snapshot as a representative image for each of the above-identified plurality of moving objects; and presenting snapshot of the identified critical objects to staff members in visual fashion.

Further, the non-transitory computer-readable medium according to the present invention contains program code which executes the above-mentioned methods of detecting critical objects from CCTV video using metadata filtering.

BRIEF DESCRIPTION OF THE DRAWINGS

FIG. 3 illustrates an example of record format of object metadata in the present invention.

DESCRIPTION OF SPECIFIC EMBODIMENTS

Exemplary embodiments of the invention will be described below in more detail with reference to the accompanying drawings.

Figure 1:
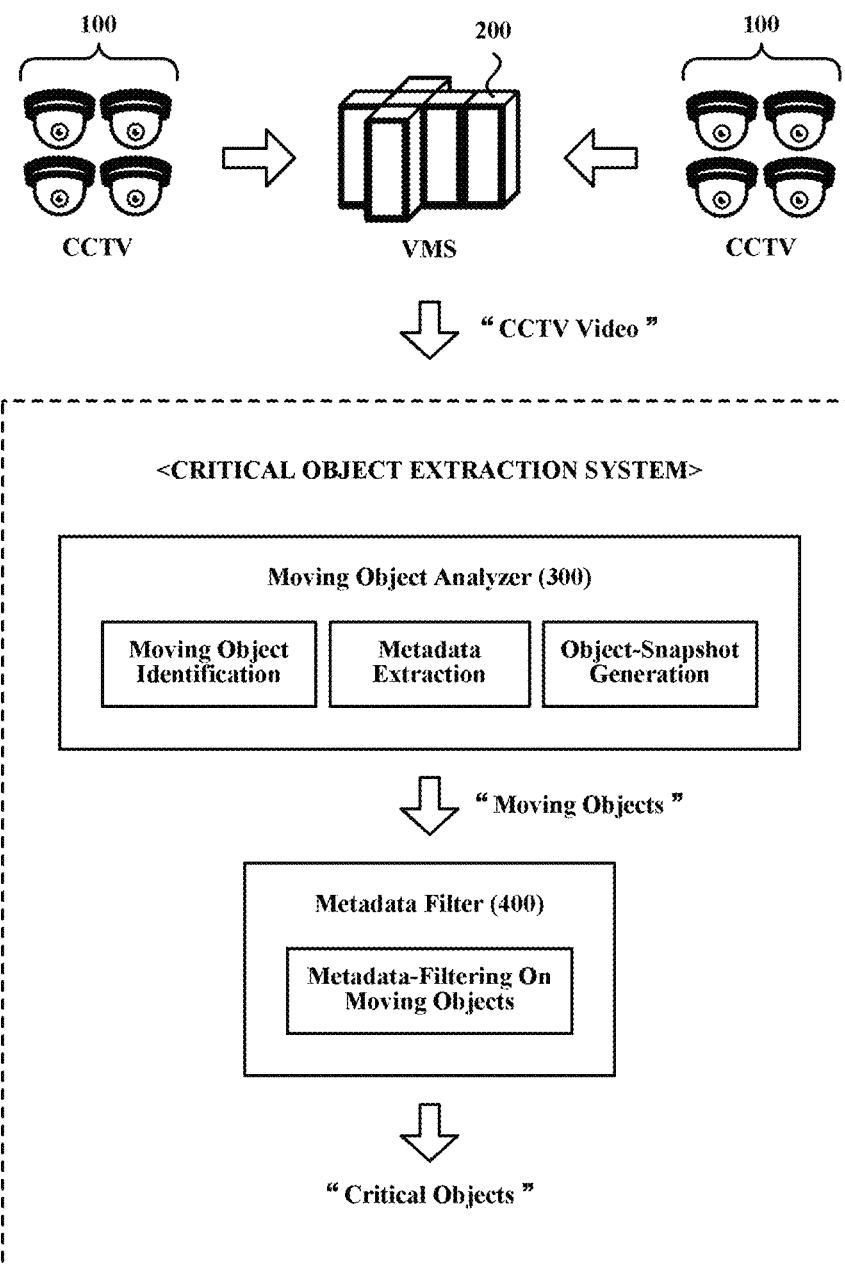
FIG. 1 is a view illustrating a critical objects extraction system according to an embodiment of the present invention.

FIG. 1 is a view illustrating a critical objects extraction system according to an embodiment of the present invention.

Referring to FIG. 1, a plurality of CCTV cameras 100 generate video data and provide them to a video management server (VMS) 200. The VMS 200 receives the CCTV video, and then provides them to the critical objects extraction system so as to detect some objects on which staff members may have attention, i.e., critical objects. The critical objects extraction system may be implemented in the VMS 200 or in additional servers (not shown).

The points which the inventor has noticed in designing the critical objects extraction system are as below. First, it is common that critical objects are found in a form of moving objects in CCTV video rather than of stationary objects. Second, lightweight algorithms shall be adopted in order to achieve real-time processing of mass video data provided from a large number of CCTV cameras 100.

In this regard, the critical objects extraction system of the present invention comprises moving object analyzer 300 and metadata filter 400.

The moving object analyzer 300 extracts moving objects out of CCTV video by lightweight algorithms. For this purpose, the moving object analyzer 300 performs foreground segmentation and blob analysis on the CCTV video so as to identify a plurality of pixel clumps (i.e., blobs) which may be the moving objects. Further, the moving object analyzer 300 generates metadata for the identified moving objects (i.e., pixel clumps or blobs) as described below, and generates object snapshot as a representative image for each of the moving objects.

The metadata filter 400 configures multi-dimensional vector plots for the plurality of moving objects using predetermined at least two records of the metadata so as to identify the distribution characteristics of the metadata. From the multi-dimensional vector plots, the metadata filter 400 may identify the characteristics of environmental noise contained in the CCTV video. Further, using a metadata boundary, the metadata filter 400 may remove the environmental noise from the identified moving objects so as to obtain critical objects, i.e., the objects which are worth of paying attention. The metadata boundary is a boundary in the records of the metadata which may separate the environmental noise from normal moving objects. The metadata boundary may be predetermined or obtained from the multi-dimensional vector plots.

The information on the critical objects which are obtained above may be provided to the CCTV integrated system, in which the critical objects may be displayed on monitoring screen so as to draw attention of staff members.

Figure 2:
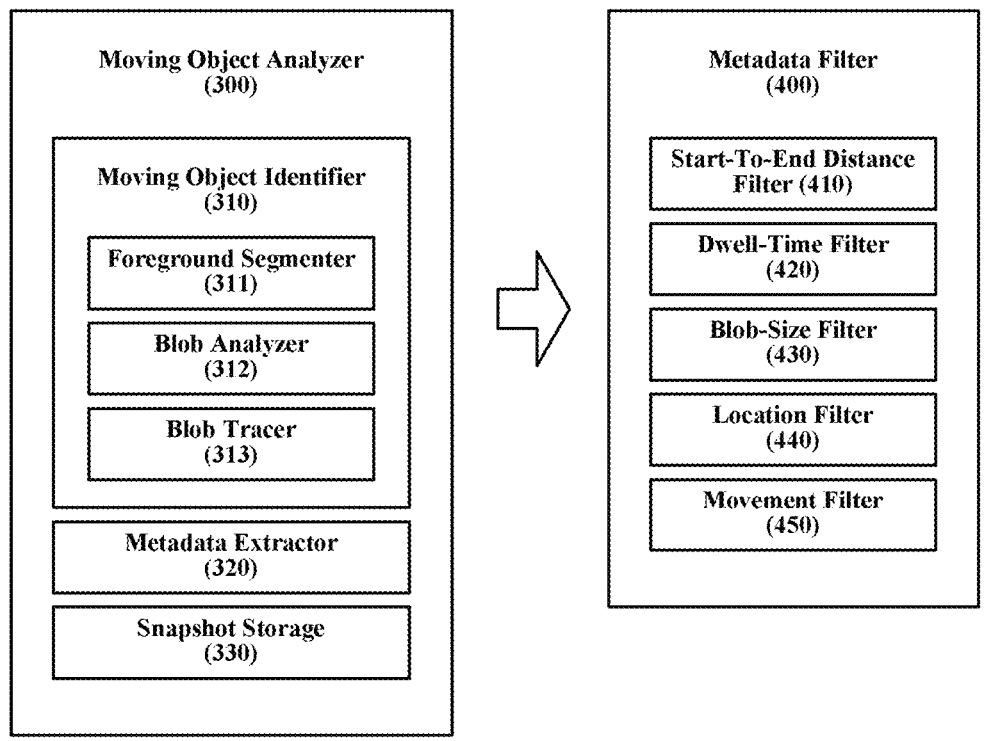
FIG. 2 is a block diagram illustrating an embodiment of the critical objects extraction system of the present invention.

FIG. 2 is a block diagram illustrating an embodiment of the critical objects extraction system of the present invention. Referring to FIG. 2, the critical objects extraction system of the present invention comprises moving object analyzer 300 and metadata filter 400.

First, the moving object analyzer 300 shall be described.

In the present invention, the moving object analyzer 300 identifies a plurality of moving objects from the CCTV video, and obtains metadata and object snapshot for each of the plurality of the moving objects. In an embodiment, the moving object analyzer 300 may comprise moving object identifier 310, metadata extractor 320, and snapshot storage 330.

The moving object identifier 310 finds changing pixel clumps out of the CCTV video and then sets the identified changing pixel clumps as the moving objects. The moving object identifier 310 may be configured to segment foreground part from the CCTV video by extracting differential images with Gaussian mixture model, to extract a plurality of pixel clumps (i.e., blobs) by blob analysis which may be suspected to be moving objects, and then to trace the track of the blobs with Kalman Filter. For that purpose, the moving object identifier 310 may comprise foreground segmenter 311, blob analyzer 312, and blob tracer 313.

The foreground segmenter 311 segments foreground pixels out of each frame image of the CCTV video by modeling the background part with Gaussian mixture model. Preferably, the procedure of background removal and foreground segmentation with Gaussian mixture model may be performed in two steps, as described below.

In the first step, background image is modeled by a plurality of Gaussian independent variables of the Gaussian mixture model, by which changing pixels are identified out of each input image of the CCTV video.

In the second step, a specific number of frames are selected from the CCTV video so as to be used in learning the Gaussian mixture model in view of background, by which the parameters of the Gaussian mixture model are steadily updated. The parameter update makes the background model (i.e., Gaussian mixture model) to adapt to time-varying luminous environment. It is preferable that the number of frames which is utilized in the learning of the Gaussian mixture model is modified corresponding to computing resource.

The blob analyzer 312 performs blob analysis on the foreground pixels (i.e., the pixels which the foreground segmenter 311 has determined as a part of foreground) so that the foreground pixels are grouped to be conceived as objects. By the blob analysis, one or more blobs of foreground objects are detected for each video frame. It is preferable that blobs smaller than a predetermined pixel size are excluded out of the detected objects so as to remove video noise factor. By the way, because the blob analysis technology has already been generally proposed in the prior art and further the present invention does not claim the blob analysis algorithm itself, the detailed description thereof shall be omitted.

The blob tracer 313 applys Kalman filter to each of the foreground objects identified above so as to sequentially estimate their moving tracks. In case of CCTV video, thirty (30) frame images are generated per each second, in which one or more foreground objects are identified for each of the frame image through foreground segmentation and blob analysis.

A series of frame images correspond to the flow of time. In this regard, as going through the frame images one by one, for each foreground object which becomes to be identified in each of the frame images, the blob tracer 313 determines the foreground object either the movement of a previous foreground object (i.e., a foreground object that was identified in previous frames), or a newly-discovered object that has not yet shown in the previous frames.

For this purpose, by using the Kalman filter, the blob tracer 313 estimates moving tracks of the foreground objects which were identified in the previous frames. Then, for the foreground object which the blob tracer 313 is currently handling, in case its current location stays within a predetermined range of the above-estimated moving tracks, the blob tracer 313 judges that the current-handling foreground object is the movement of a previous foreground object and then adds the current location to the corresponding estimated moving track.

In the other hand, in case its current location goes out of the predetermined range of the above-estimated moving tracks, the blob tracer 313 judges that the current-handling foreground object is a newly-discovered object that has not yet shown in the previous frames and then assigns new identification numbers (ID's) to the current-handling foreground object and its moving track. In an embodiment, the Euclidean Distance Score may be preferably utilized in determining whether the current location is within a predetermined range of the above-estimated moving tracks or not.

By the way, the moving object identifier 310 may be implemented in various fashions. In an embodiment, the moving object identifier 310 estimates moving tracks of foreground objects after identifying all the foreground objects from the overall CCTV videos. In another embodiment, the moving object identifier 310 estimates moving tracks of foreground objects whenever identifying a predetermined number (e.g., five) of foreground objects.

The metadata extractor 320 generates metadata for the detected moving objects (hereinafter, it is referred as 'the detected objects' in short). As described above, the moving objects are identified by the moving track estimation of the blob tracer 313. The metadata extractor 320 generates and collects metadata for each of the detected objects which is corresponding to its exposure attribute in the CCTV video. FIG. 3 illustrates an example of record format of object metadata in the present invention. These metadata shall be provided to the metadata filter 400 for further analysis.

The snapshot storage 330 generates a representative image for each of the detected objects, i.e., object snapshot. As described above, the moving objects are identified by the moving track estimation of the blob tracer 313. The snapshot storage 330 generates a snapshot image for representing each object. The biggest image in the CCTV video may be searched and captured for each object. Otherwise, a blob in its moving track which is larger than a predetermined pixel size may be selected and captured for each object.

Then, the metadata filter 400 shall be described.

In the present invention, the metadata filter 400 performs object filtering based on the metadata which the moving object analyzer 300 has accumulated, so as to extract critical objects out of the plurality of moving objects. In an embodiment, the metadata filter 400 may comprise start-to-end distance filter 410, dwell-time filter 420, blob-size filter 430, location filter 440, and movement filter 450.

The start-to-end distance filter 410 performs start-to-end distance filtering in order to remove video noise. The appearance location indicates the location of first occurrence of the object in the CCTV video, whereas the disappearance location indicates the location of last occurrence of the object in the CCTV video. Considering that environmental noise commonly occurs without changing its location, the objects of small start-to-end distance (i.e., distance between the appearance location and the disappearance location) are preferably filtered out. In an embodiment, objects of the start-to-end distance less than 60 pixels may be filtered out.

The dwell-time filter 420 performs dwell time filtering in order to remove video noise. The objects having short dwell time (i.e., the time duration when the object occurs in the CCTV video) are regarded as stationary noise and are preferably filtered out. In an embodiment, objects of the dwell time less than 5 seconds may be filtered out.

The blob-size filter 430 performs object filtering by setting a boundary on blob size corresponding to staff members' intention. In an embodiment, objects of smaller than 100 pixels may be filtered out.

The location filter 440 performs object filtering by specifying location characteristics of blobs, i.e., by limiting area in real space sense where the critical objects may exist, corresponding to staff members' intention. In an embodiment, staff members may set a rectangle in CCTV video, and then extract objects coming into the rectangle. Further, staff members may set a line in CCTV video, and then extract objects cross the line.

The movement filter 450 performs object filtering by specifying movement characteristics of blobs corresponding to staff members' intention. Preferably, staff members may select some of objects by specifying object's moving direction (i.e., the vector connecting the start and the ending points). Or, staff members may select some of objects by specifying object's moving speed (e.g., 60~100 pixels/second).

Figure 4:
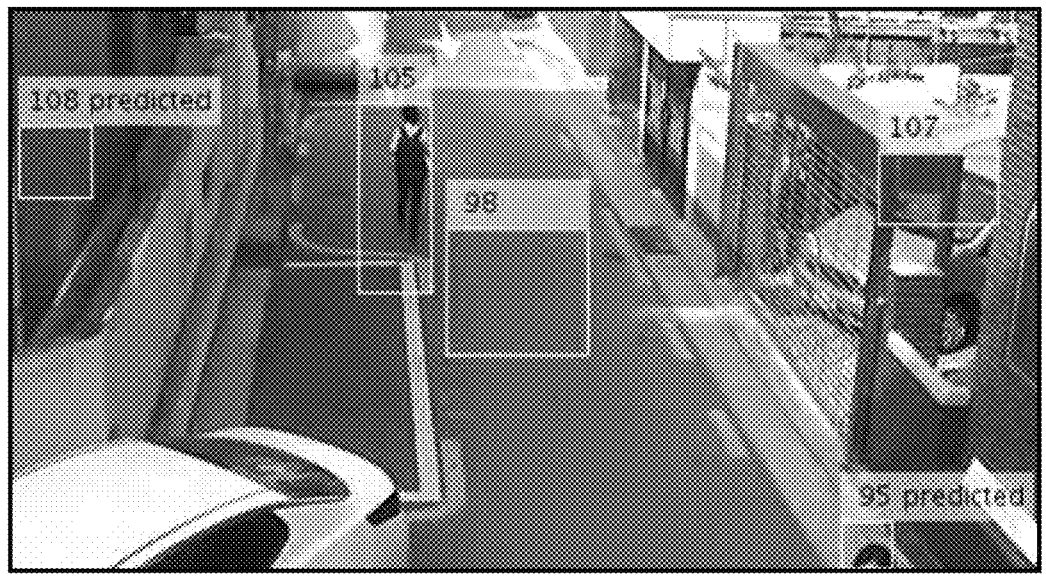
FIG. 4 illustrates an example of CCTV video.
Figure 5:
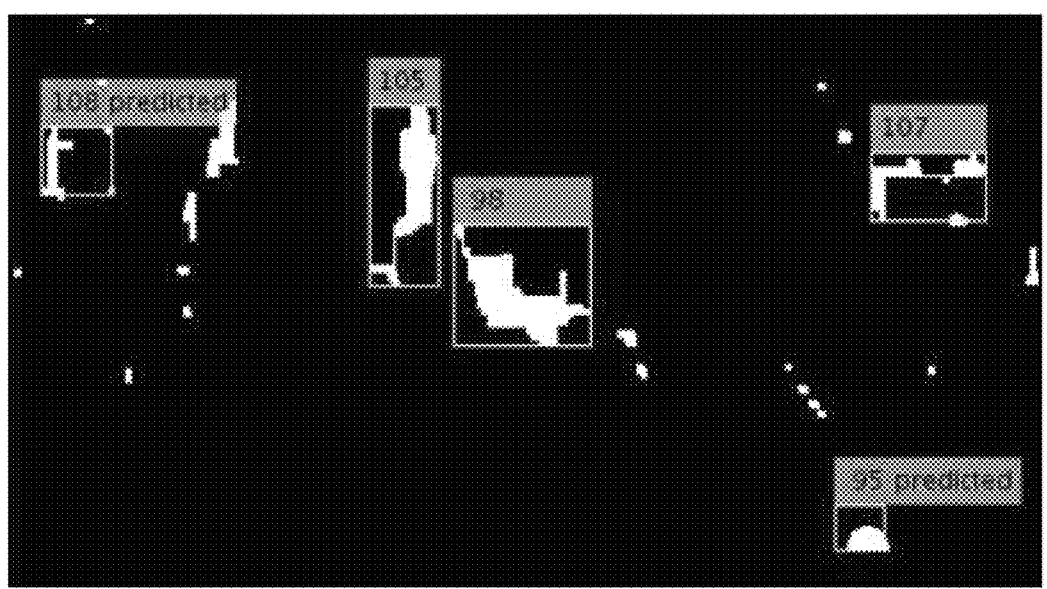
FIG. 5 illustrates an example of the result of foreground segmentation and blob analysis according to the present invention.
Figure 6:
FIG. 6 illustrates an example of the detection result of moving objects according to the present invention.

FIG. 4 illustrates an example of CCTV video. FIG. 5 illustrates an example of the result of foreground segmentation and blob analysis according to the present invention. FIG. 6 illustrates an example of the detection result of moving objects according to the present invention.

FIGS. 4 to 6 illustrate an example of applying the moving-object recognition technology of the present invention to CCTV video of a period of time. In this example, the CCTV video is chosen so as to monitor wide area. Further, the CCTV video is chosen so as to contain a lot of building shadows so that the effect of various time-varying environmental factors including the luminous environment may be reflected.

FIG. 5 illustrates an example of the result of applying the foreground segmentation and the blob analysis to a specific image of the CCTV video shown in FIG. 4. Describing the result of the foreground segmentation with referring to FIG. 5, the background parts are shown in black whereas the foreground parts are shown in white.

Further, describing the result of the blob analysis with referring to FIG. 5, among a lot of white pixel clumps, some are marked with rectangle, but the others are not marked. The marked pixel clumps are what are suspected as objects by the result of the blob analysis, whereas the unmarked pixel clumps are what are not supposed to be objects by the result of the blob analysis. The unmarked pixel clumps may be neglected in further procedure.

FIG. 6 illustrates an example of the detection result of moving objects according to the present invention, in which appearance locations are marked for the detected objects which are identified by the foreground segmentation and blob analysis. It is shown that a lot of clutters are also detected due to time-varying luminous environment. For example, the clutters may be detected by shaken laundarys or time-varying building shadows. FIG. 6 shows 807 detected objects, which indicates that the foreground segmentation and the blob analysis may insert a lot of noise in the detection result.

In the present invention, a lightweight image analysis engine is incorporated for identifying blobs (i.e., pixel clumps) which are suspected as moving objects out of the CCTV video. However, this lightweight image analysis engine has a disadvantage of inserting a lot of clutters in the detection result by simply regarding time-varying pixel clumps as blobs. In this specification, the clutters may include image noise in CCTV video due to for example surface of the ground, surface of the sea, raindrops, snow, fog, etc. Referring to FIG. 6, 807 objects are detected, most of which are clutters.

However, because the lightweight image analysis engine detects all the moving objects out of the CCTV video, the detection result shall contain the critical objects. In the present invention, metadata filtering selects the critical objects among the detected moving objects.

Figure 7:
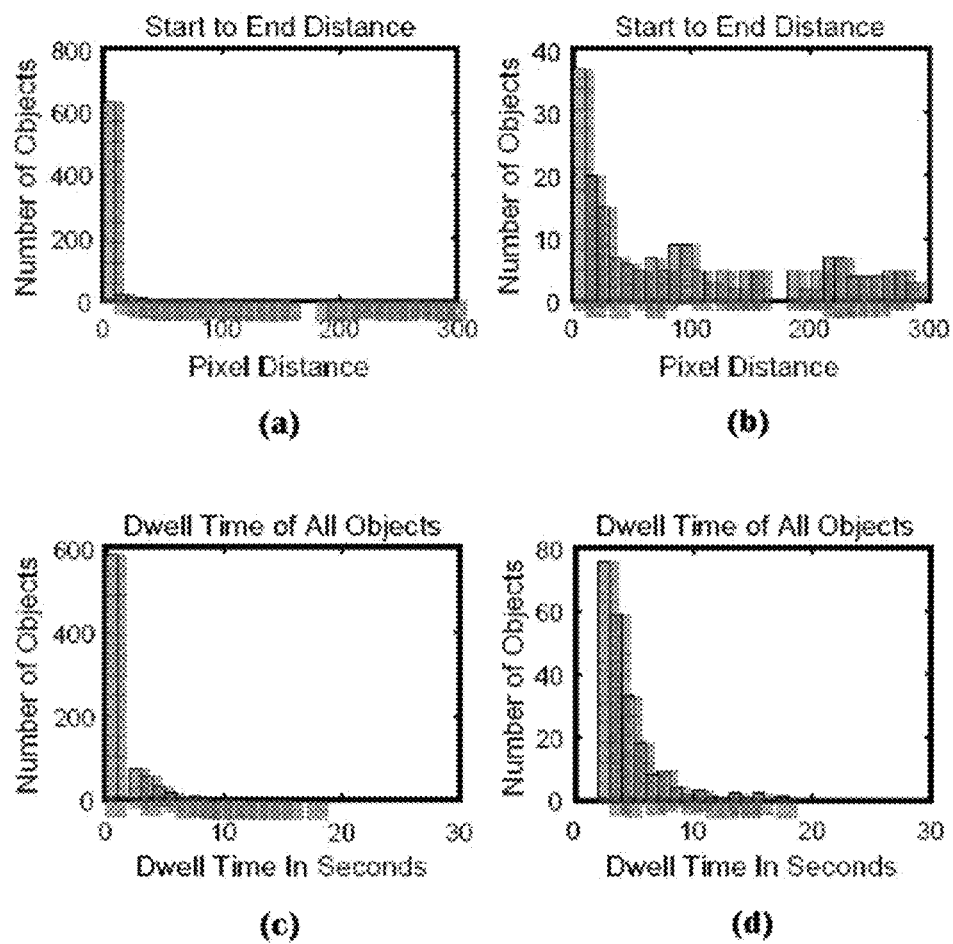
FIG. 7 illustrates an example of start-to-end distance distribution and dwell time distribution in the present invention.
Figure 8:
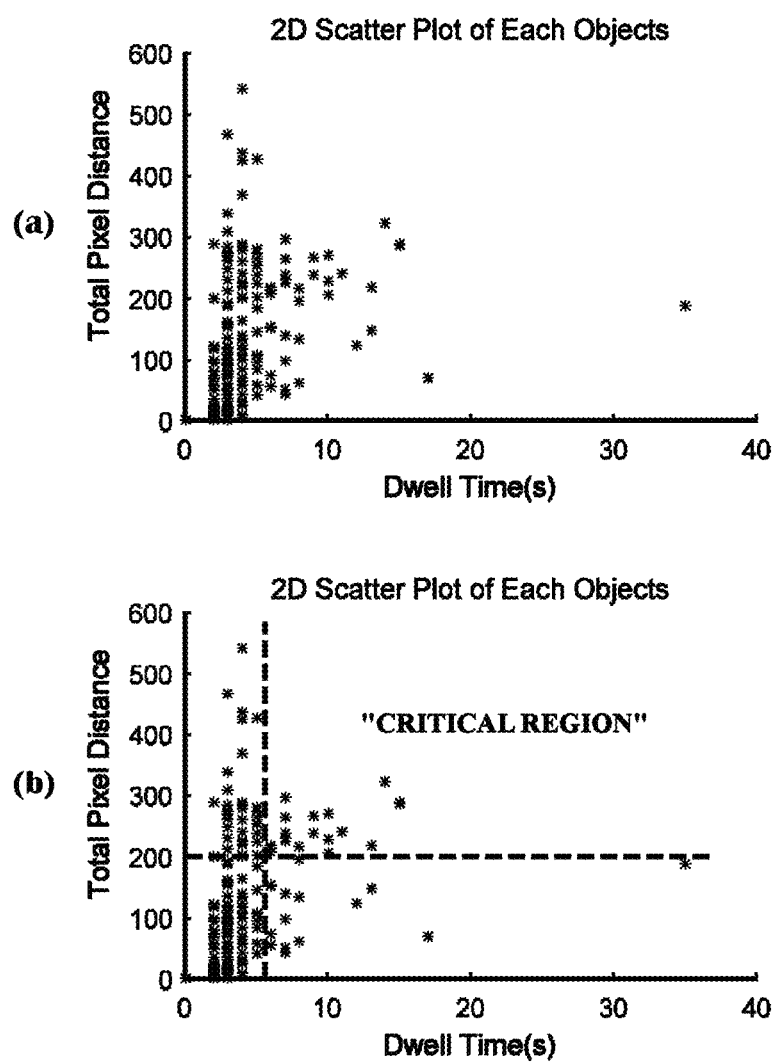
FIG. 8 is a view illustrating 2-dimensional scatter plots showing the distribution of moving objects and the corresponding critical region in the present invention.

FIG. 7 illustrates an example of the start-to-end distance distribution and the dwell time distribution in the present invention, and FIG. 8 is a view illustrating 2-dimensional scatter plots showing the distribution of moving objects and the corresponding critical region in the present invention.

In order to extract critical objects which are worth of paying attention out of the 807 objects which are detected by the above-described procedures of FIGS. 4 to 6, the metadata distribution of the detected objects shall be analyzed.

FIG. 7 illustrates an example of histograms for start-to-end distance and dwell time as exemplary shown FIG. 3 with respect to the moving objects.

FIGS. 7 (a) and (b) illustrate the start-to-end distance distributions of the detected objects. Referring to FIG. 7 (a), the first bin contains most of objects, i.e., more than 600 objects, which may be regarded as a plurality of stationary clutters in the first bin. FIG. 7 (b) illustrates the start-to-end distance distribution with let the first bin removed in order to more clearly show the distribution of the other bins.

FIGS. 7 (c) and (d) illustrate the dwell time distribution of the detected objects. FIGS. 7 (c) and (d) shows similar distribution fashion as the start-to-end distance, except that clutters are more dispersed than the start-to-end distance case.

As described above, the moving object identifier 310 outputs a plurality of detected objects, most of which are environmental noise. In order to discriminate critical objects from environmental noise, boundary for the metadata (i.e., metadata boundary) is required. The metadata boundary may be predetermined when designing its responding software, set by staff members, or obtained from metadata distribution of the detected objects. For this purpose, FIG. 8 (a) illustrates a 2-dimensional scatter plot with x-axis of dwell time and y-axis of start-to-end distance.

Based on the metadata distribution of FIG. 8 (a), it may be expected that the objects with dwell time of 5 seconds or more and start-to-end distance of 200 pixels or more are the critical objects. In an embodiment, a boundary may be obtained from the metadata distribution so as to make the percentage of critical objects among the detected object to be lower than a predetermined rate, and then may be applied to the metadata filtering.

FIG. 8 (b) illustrates an example of applying the boundary of the start-to-end distance and dwell time to the 2-dimensional scatter plot of FIG. 8 (a) so as to define a critical region. Further, FIG. 9 shows that a small number of critical objects are selected based on the critical region.

Figure 9:
FIG. 9 illustrates an example of metadata filtering result according to the present invention.

FIG. 9 illustrates an example of metadata filtering result according to the present invention, in which appearance locations are marked for the critical objects which are extracted by the metadata filtering based on the critical region. In this embodiment, 34 critical objects are extracted out of the 807 detected objects. That is, metadata filtering may significantly reduce the number of objects which are worth of paying attention.

Figure 10:
FIG. 10 illustrates examples of snapshots of the critical objects according to the present invention.

When the inventor identifies the CCTV video directly by eyes, the number of critical objects moving in the CCTV video (e.g., human, vehicle, etc.) is eleven (11). The present invention has extracted nine (9) critical objects among these eleven (11) ones, which means detection rate of 82%. The remaining 23 critical objects which have been extracted as critical objects by the present invention are actually clutters. FIG. 10 illustrates examples of snapshots of the critical objects which have passed the metadata filtering according to the present invention.

Referring FIGS. 9 and 10, although including some clutters in critical objects, it is confirmed that the present invention may reliably detect critical objects which have to be detected. The present invention may provide snapshot of the critical objects so that the staff members may filter out the clutters which are possibly included in the critical objects. By the way, the remaining two (2) critical objects, which were not detected by the present invention in this example, were tiny pixel clumps so as to be neglected in the blob analysis. It is hard to expect for staff members to conceive such tiny pixel clumps in real-time application.

Figure 11:
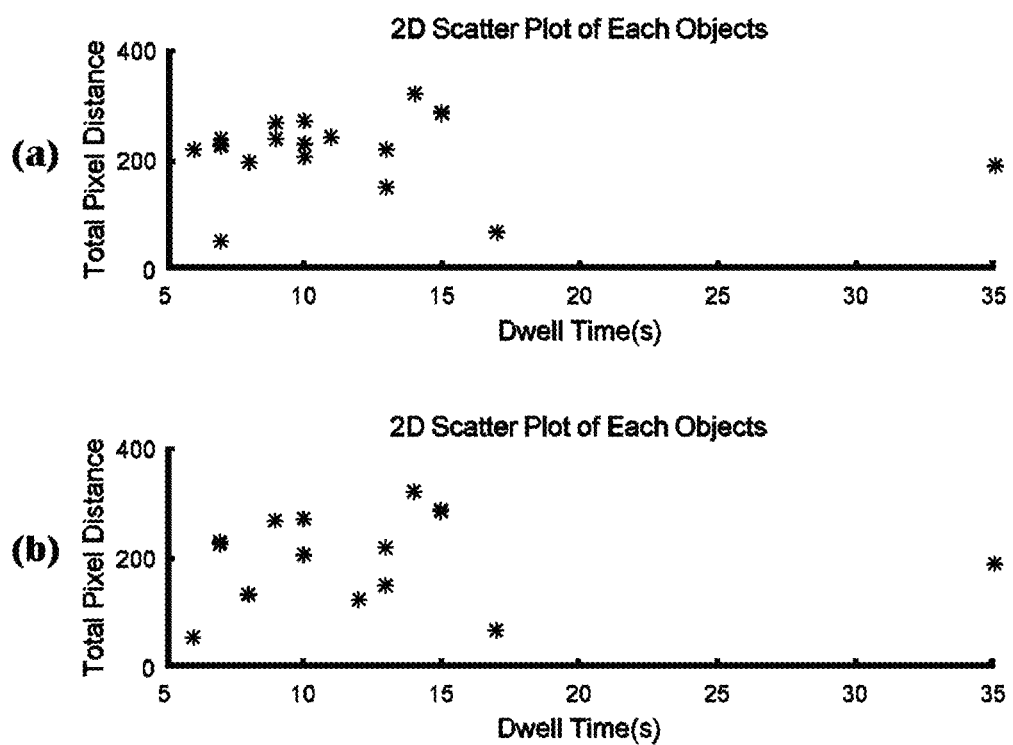
FIG. 11 illustrates an example of context-based clutter removal according to the present invention.

FIG. 11 illustrates an example of context-based clutter removal according to the present invention. FIG. 11 (*a*) illustrates 2D scatter diagram of detected objects which having crossed a user-defined line, whereas FIG. 11 (*b*) illustrates 2D scatter diagram of detected objects which having passed a user-defined area.

In order to effectively remove clutters out of the object detection result of the moving object analyzer 300, the location filter 440 may utilize context information of the CCTV video, i.e., the location characteristics.

Referring to FIG. 4, CCTV video has background of vertically arranged road, and therefore most of critical objects move in vertical direction. In view of this circumstance, by setting a horizontal line in the middle of the CCTV video so as to collect the objects crossing the horizontal line, sixteen (16) objects may be extracted as shown in FIG. 11 (*a*).

That is, clutters are effectively removed by utilizing context information, when considering that 16 objects have been extracted out of 807 detected objects. When the inventor identifies this CCTV video directly by eyes, among the 16 objects extracted above, three (3) objects are clutters whereas thirteen (13) objects are actually significant objects. Therefore, clutters are reliably removed by utilizing context information.

Further, by setting a rectangular area in the middle of the CCTV video so as to collect the objects entering therein, seventeen (17) objects may be extracted as shown in FIG. 11 (*b*). When the inventor identifies this CCTV video directly by eyes, among the 17 objects extracted above, two (2) objects are clutters whereas fifteen (15) objects are actually significant objects.

As described above, the method of detecting critical objects according to the present invention provides one or more of the following effects.

The present invention makes it possible to detect critical objects out of CCTV video with utilizing lightweight algorithms, which enables real-time processing by video analysis servers of normal computing power. Therefore, the efficiency of integrated control centers may be improved where massive CCTV videos are gathered from a large number of CCTV cameras.

Further, the present invention makes it possible to detect relatively small number of critical objects out of massive CCTV videos with proposing their representative images (i.e., snapshots) so that staff members of integrated control centers may effectively search specific objects such as a lost child or a getaway vehicle out of CCTV video.

The invention can also be embodied as computer readable codes on a non-transitory computer-readable medium. The non-transitory computer-readable medium is any data storage device that can store data which may be thereafter read by a computer system, which include read-only memory (ROM), random-access memory (RAM), CD-ROMs, magnetic tapes, floppy disks, and optical data storage devices. The non-transitory computer-readable medium can also be distributed over network coupled computer systems so that the computer readable code is stored and executed in a distributed fashion.

What is claimed is:

1. A method of detecting critical objects from CCTV video using metadata filtering, the method comprising:
    identifying a plurality of moving objects from the CCTV video;
    obtaining metadata of the moving objects corresponding to their exposure attribute in the CCTV video; and
    filtering the moving objects based on the exposure attribute so as to select at least one critical object out of the plurality of moving objects,
    wherein the filtering the moving objects comprises:
    filtering out with reference to the metadata of a plurality of moving objects one or more moving object whose start-to-end distance in the CCTV video is smaller than a predetermined threshold pixel; and
    filtering out with reference to the metadata of a plurality of moving objects one or more moving object whose dwell time in the CCTV video is shorter than a predetermined threshold time.

2. The method according to the claim 1, wherein the identifying a plurality of moving objects comprises:
    segmenting foreground from the CCTV video;
    performing blob analysis on the segmented foreground so as to extract a plurality of foreground objects;
    searching a series of frame images of the CCTV video in sequence for newly-discovered objects in each of the frame image wherein the newly-discovered objects are identified as foreground objects which are newly discovered in the corresponding frame image; and
    configuring the newly-discovered objects as moving objects,
    and wherein the searching a series of frame images of the CCTV video in sequence for newly-discovered objects comprises:
    selecting a current frame image out of the series of frame images;
    identifying foreground objects which are extracted in the current frame image;
    identifying foreground objects which are extracted in previous frame images;
    applying Kalman filter to the previous foreground objects so as to estimate moving tracks of the previous foreground objects;
    determining newly-discovered objects out of the current foreground objects wherein the newly-discovered objects are identified as being located outside of a predetermined range from the estimated moving tracks; and
    re-selecting the current frame image as the next frame image in the series of frame images and then going back to the identifying current foreground objects.

3. The method according to the claim 2, wherein the segmenting foreground comprises:
    identifying changing pixels out of each input image of the CCTV video by applying Gaussian mixture model in which background image is modeled by a plurality of Gaussian independent variables;
    updating the parameters of the Gaussian mixture model by learning the Gaussian mixture model using a number of frames of the CCTV video; and
    modifying the number of frames which is utilized in the learning of the Gaussian mixture model corresponding to computing resource.

4. The method according to the claim 1, wherein the filtering the moving objects further comprises:
    analyzing metadata distribution with regard to the start-to-end distance and the dwell time for the plurality of moving objects;
    obtaining a first boundary of start-to-end distance based on the metadata distribution so that the percentage of moving objects having larger start-to-end distance than the first boundary is smaller than a predetermined value;

setting the threshold pixel to the first boundary of start-to-end distance;

obtaining a second boundary of dwell time based on the metadata distribution so that the percentage of moving objects having longer dwell time than the second boundary is smaller than a predetermined value; and setting the threshold time to the second boundary of dwell time.

5. The method according to the claim 1, wherein the filtering the moving objects further comprises:

selecting with reference to the metadata of a plurality of moving objects at least one moving object whose location in the CCTV video satisfies an area condition which is specified by an operator; and selecting with reference to the metadata of a plurality of moving objects at least one moving object whose moving direction or moving speed is movement characteristics condition which is specified by an operator.

6. The method according to the claim 5, wherein the method further comprising:

generating snapshot as a representative image for each of the above-identified plurality of moving objects; and presenting snapshot of the identified critical objects to staff members in visual fashion.

7. A non-transitory computer-readable medium containing program code which executes a method of detecting critical objects out of CCTV video using metadata filtering on moving objects, the method comprising:

identifying a plurality of moving objects from the CCTV video;

obtaining metadata of the moving objects corresponding to their exposure attribute in the CCTV video; and filtering the moving objects based on the exposure attribute so as to select at least one critical object out of the plurality of moving objects, wherein the filtering the moving objects comprises:

filtering out with reference to the metadata of a plurality of moving objects one or more moving object whose start-to-end distance in the CCTV video is smaller than a predetermined threshold pixel; and filtering out with reference to the metadata of a plurality of moving objects one or more moving object whose dwell time in the CCTV video is shorter than a predetermined threshold time.

8. A non-transitory computer-readable medium according to claim 7, wherein the identifying a plurality of moving objects comprises:

segmenting foreground from the CCTV video;

performing blob analysis on the segmented foreground so as to extract a plurality of foreground objects;

searching a series of frame images of the CCTV video in sequence for newly-discovered objects in each of the frame image wherein the newly-discovered objects are identified as foreground objects which are newly discovered in the corresponding frame image; and configuring the newly-discovered objects as moving objects, and wherein the searching a series of frame images of the CCTV video in sequence for newly-discovered objects comprises:

selecting a current frame image out of the series of frame images;

identifying foreground objects which are extracted in the current frame image;

identifying foreground objects which are extracted in previous frame images;

applying Kalman filter to the previous foreground objects so as to estimate moving tracks of the previous foreground objects;

determining newly-discovered objects out of the current foreground objects wherein the newly-discovered objects are identified as being located outside of a predetermined range from the estimated moving tracks; and re-selecting the current frame image as the next frame image in the series of frame images and then going back to the identifying current foreground objects.

9. A non-transitory computer-readable medium according to claim 8, wherein the segmenting foreground comprises:

identifying changing pixels out of each input image of the CCTV video by applying Gaussian mixture model in which a plurality of Gaussian independent variables are modeled to background image;

updating the parameters of the Gaussian mixture model by learning the Gaussian mixture model using a number of frames of the CCTV video; and modifying the number of frames which is utilized in the learning of the Gaussian mixture model corresponding to computing resource.

10. A non-transitory computer-readable medium according to claim 7, wherein the filtering the moving objects further comprises:

analyzing metadata distribution with regard to the start-to-end distance and the dwell time for the plurality of moving objects;

obtaining a first boundary of start-to-end distance based on the metadata distribution so that the percentage of moving objects having larger start-to-end distance than the first boundary is smaller than a predetermined value;

setting the threshold pixel to the first boundary of start-to-end distance;

obtaining a second boundary of dwell time based on the metadata distribution so that the percentage of moving objects having longer dwell time than the second boundary is smaller than a predetermined value; and setting the threshold time to the second boundary of dwell time.

11. A non-transitory computer-readable medium according to claim 7, wherein the filtering the moving objects further comprises:

selecting with reference to the metadata of a plurality of moving objects at least one moving object whose location in the CCTV video satisfies an area condition which is specified by an operator; and selecting with reference to the metadata of a plurality of moving objects at least one moving object whose moving direction or moving speed is movement characteristics condition which is specified by an operator.

12. A non-transitory computer-readable medium according to claim 11, wherein further comprising:

generating snapshot as a representative image for each of the above-identified plurality of moving objects; and presenting snapshot of the identified critical objects to staff members in visual fashion.

* * * * *